United States Patent [19]

Feiler et al.

[11] 3,945,985

[45] Mar. 23, 1976

[54] METHOD FOR PREPARING VINYL HALIDE POLYMERS HAVING IMPROVED PROCESSING CHARACTERISTICS AND POLYMERS PREPARED THEREBY

[75] Inventors: Leonard Feiler, Riverdale, N.Y.; Sheldon F. Gelman, Danbury, Conn.

[73] Assignee: Stauffer Chemical Company, Westport, Conn.

[22] Filed: Aug. 23, 1971

[21] Appl. No.: 174,250

Related U.S. Application Data

[63] Continuation of Ser. No. 756,309, Aug. 8, 1968, abandoned.

[52] U.S. Cl... 260/92.8 W; 260/78.5 N; 260/80.3 E; 260/82.1; 260/85.5 XA; 260/86.3; 260/87.1; 260/87.5 A; 260/87.5 B; 260/87.5 C; 260/87.7; 260/91.7; 260/92.1 R; 260/92.8 R; 260/879

[51] Int. Cl.$^2$.. C08F 3/30; C08F 3/20; C08F 15/06; C08F 15/32

[58] Field of Search.... 260/92.8 W, 92.8 R, 78.5 N, 260/80.3 E, 82.1, 85.5 XA, 86.3, 87.1, 87.5 A, 87.5 B, 87.5 C, 87.7, 91.7, 92.1

[56] References Cited

UNITED STATES PATENTS

| | | | |
|---|---|---|---|
| 3,022,282 | 2/1962 | Marous et al. | 260/92.8 W |
| 3,033,839 | 5/1962 | Heckmaier et al. | 260/92.8 W |
| 3,364,182 | 1/1968 | Griffith | 260/79 |
| 3,468,859 | 9/1969 | Davies | 260/87.5 |
| 3,546,323 | 1/1970 | Hwa et al. | 260/879 |
| 3,696,083 | 10/1972 | Hwa | 260/79 |

*Primary Examiner*—Christopher A. Henderson, Jr.
*Attorney, Agent, or Firm*—Paul J. Juettner

[57] ABSTRACT

Vinyl halide polymers, preferably polyvinyl chloride, which exhibit improved processing characteristics without sacrificing physical properties are prepared by partially polymerizing vinyl halide monomer at a first reaction temperature and then changing the reaction temperature and continuing the polymerization at a second temperature conducive to forming a polymer of an average molecular weight range different from that obtainable at the first reaction temperature. The product provides the physical characteristics of polymer blends but can be processed without formation of fish eyes.

5 Claims, No Drawings

METHOD FOR PREPARING VINYL HALIDE POLYMERS HAVING IMPROVED PROCESSING CHARACTERISTICS AND POLYMERS PREPARED THEREBY

CROSS REFERENCE TO RELATED APPLICATION

This application is a continuation of Ser. No. 756,309, filed Aug. 8, 1968, and now abandoned.

The present invention is directed to a method for preparing vinyl halide polymers which exhibit improved processing characteristics without sacrificing physical properties. Particularly, the present invention relates to a method for preparing vinyl halide polymers which have physical properties approximating polymer blends but which can be easily processed and provide final formed objects without fish eyes.

Vinyl halide polymers can be prepared in a wide variety of molecular weights, those of higher molecular weight generally having better physical properties such as toughness, than those of lower molecular weight. However, the higher the molecular weight of the polymer, the more difficult it is to process into final products. In milling and extruding, the higher molecular weight polymers require more shear force and/or higher temperature to flux the polymer as compared to lower molecular weight materials. The increased shear force and/or the increased temperature increases the internal temperature of the polymer. Since vinyl halide polymers are thermally unstable and degrade in the presence of heat, this increase in internal temperature of the polymer is disadvantageous. Also, the use of increased shear forces requires the input of additional work energy as compared to polymers of lower molecular weight and this additional work energy adds to the cost of processing the polymer. In an attempt to obtain easier fluxing of the lower average molecular material and the physical properties of the higher average molecular weight materials, vaious blends of these materials have been formulated. However, these attempts to blend the two types of materials have been frought with difficulty in that intimate admixtures cannot be obtained. During processing, the low average molecular weight material fluxes first and, due to the poor heat transfer characteristics of vinyl halide polymers, the higher average molecular weight material is only partially fluxed. Further, the shear forces applied during processing to affect flux are not applied to the higher average molecular weight materials as they are floating in the fluxed low average molecular weight material and are passed through the processing equipment without being fused. Products formed from such blends have noticeable imperfections called fish eyes, which are gel particles of unfused higher molecular weight polymer. These fish eyes are not only disadvantageous from an aesthetic point of view but also extremely weaken the product. Any product which must withstand some impact such as tubes, bottles and the like must be devoid of fish eyes. In as much as vinyl halide polymers are thermally degradable and become more unstable the longer they are worked under shear, it has been found impractical to subject such blends to high processing temperatures or extended processing or both to overcome the problem of fish eyes. Such extended working is also economically impractical.

It has now been found that vinyl halide polymers can be economically prepared, which provide the desired broad range of average molecular weight ranges of blends but which can be easily processed without forming fish eyes in the finally formed products. These products can also be characterized as polymers which exhibit improved processing characteristics without sacrificing physical properties.

In accordance with the present invention, there is provided a method for preparing vinyl halide polymers which exhibit improved processing characteristics which comprises initiating at a first reaction temperature the free radical polymerization of an ethylenically unsaturated monomer composition containing a predominant amount of vinyl halide monomer of the formula:

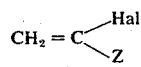

wherein Z is hydrogen or halogen and Hal means halogen and after partial polymerization is accomplished, changing the reaction temperature to a second and subsequent reaction temperatures and continuing the polymerization at the second and subsequent reaction temperatures, each reaction temperature being different from the immediately preceding reaction temperature, the second temperature being conducive to forming a polymer of an average molecular weight different from the average molecular weight obtainable at the first polymerization temperature. Surprisingly, polymers can be formed which are thermoplastic polymers of high average molecular weight which are characterized by physical properties commensurate with polymers of equal average molecular weight formulated by standard polymerization techniques with the additional advantage that the melt flow viscosity under shear of the polymers of the invention is decreased so as to provide improved processing characteristics. The decrease in melt flow viscosity under shear allows for the processing of the polymer under thermal conditions which are less conducive to degradation without the sacrifice of physical properties which the polymer is capable of providing. Further, these polymers provide products which approximate the physical properties of blends but can be processed without forming fish eyes.

The exact chemical nature of the polymer which is formed by the process of the present invention is not known. In theory, it is believed that an intimate blend of polymer chains having a broad distribution of molecular weights are formed within each polymer particle in the finally obtained product. The foregoing is theory and applicant is not intended to be bound thereby.

The vinyl halide monomers, included within the formula given above, that can be used in the present invention include, for example, vinyl fluoride, vinyl chloride, vinyl bromide, vinyl iodide, vinylidene fluoride, vinylidene chloride, vinylidene bromide, vinylidene iodide and the like, though vinyl chloride is preferred. The formula is intended to include all α-halo-substituted ethylenically unsaturated materials which are included within the limits of the formula and which are capable of entering into an addition polymerization reaction. The polymers of the present invention can be formed of the same or different monomer materials falling within the formula and, thus, the invention and the term vinyl halide as used in the claims is intended to include both homo and copolymers of compounds falling within the given formula. Illustrative of these copolymers is a copolymer of vinyl chloride and vinylidene chloride.

While it is preferred that the monomer composition be comprised totally of vinyl halide monomer, the present invention is also intended to include copolymers formed by the free-radical addition polymerization of a monomer composition containing a predominant amount, e.g., at least 50% of vinyl halide and a minor amount, e.g., up to 50% by weight of another ethylenically unsaturated comonomer material copolymerizable therewith. Preferably, the other ethylenically unsaturated comonomer material is used in amounts of less than 25% by weight and more preferably in amounts less than 10% by weight of the total monomer materials used in preparing the polymer. Suitable ethylenically unsaturated comonomer materials can be illustrated by such materials as ethylene and propylene, styrene and substituted derivatives, such as o-, m- or p-methyl or alphamethyl styrene; and halogenated styrenes such as alpha-chlorostyrene; monoolefinically unsaturated esters including vinyl esters, such as vinyl acetate; alkyl methacrylates, such as e.g., methyl and ethyl methacrylate; alkyl crotonates, e.g. octyl; alkyl acrylates, e.g., methyl and ethyl; vinyl esters of halogenated acids, e.g., vinyl alpha-chloroacetate; allyl and methallyl esters, e.g., allyl chloride, allyl cyanide; allyl chlorocarbonate, allyl nitrate, allyl formate and allyl acetate and the corresponding methallyl compounds; esters of alkenyl alcohols, e.g., beta-ethyl allyl alcohol and beta-propyl allyl alcohol; halo-alkyl acrylates, e.g., methyl alpha-chloroacrylate; alkyl alpha-cyanoacrylates, e.g., methyl alpha-cyanoacrylate and ethyl alpha-cyanoacrylate; maleates, e.g., monomethyl maleate, diethyl maleate; and fumarates, e.g., monoethyl fumarate, dimethyl fumarate; monoolefinically unsaturated organic nitriles including, for example, acrylonitrile and methacrylonitrile; monoolefinically unsaturated carboxylic acids including, for example, acrylic acid, methacrylic acid, maleic, fumaric and itaconic acids, maleic anhydride and the like. Amides of these acids, such as acrylamide, are also useful. Vinyl alkyl ethers and vinyl ethers, e.g., vinyl methyl ether, vinyl ethyl ether, vinyl propyl ether, vinyl n-butyl ether; and diolefinically unsaturated hydrocarbons containing two olefinic groups in conjugated relation and the halogen derivatives thereof, e.g., butadiene-1,3; 2-methyl-butadiene-1,3; 2-chloro-butadiene-1,3; and the like. These are given as illustrative of the numerous comonomers which can be used in the present invention and in no way is applicant intended to be limited thereto.

Specific monomer compositions for forming copolymers can be illustrated by vinyl chloride and/or vinylidene chloride and vinyl acetate, vinyl chloride and/or vinylidene chloride and maleic or fumaric acid esters, vinyl chloride and/or vinylidene chloride and acrylate or methacrylate ester, vinyl chloride and/or vinylidene chloride and vinyl alkyl ether. These are given as illustrative of the numerous combinations of monomers possible for the formation of copolymers. The present invention is intended to cover all such combinations which fall within the scope of the present invention. While these combinations are intended to be included within the scope of the present invention, it is preferred that the polymer be formed from pure vinyl halide monomer and most preferably pure vinyl chloride.

The free-radical polymerization can, in accordance with the method of the present invention, be accomplished using the various conventional methods of polymerization, viz., bulk, or mass, or so-called oil-phase polymerization of vinyl halide; solution polymerization where the vinyl halide is dissolved in a solvent; suspension, or bead, or granular polymerization where the vinyl halide is suspended in the form of large droplets in an aqueous medium generally containing a non-emulsifying suspending agent such as hydroxy methyl cellulose or polyvinyl alcohol; and emulsion polymerization where the vinyl halide is emulsified in water by means of a surface-active emulsifying agent, though suspension polymerization is preferred. Details of these methods of polymerization generally are found in "Unit Processes in Organic Synthesis" by F. H. Groggins, third edition, pages 847–858 (published by McGraw-Hill Book Company, Inc., N.Y., 1947) and details of the methods of polymerizing vinyl halides are found in "Vinyl and Related Polymers" by C. E. Schildknecht, pages 392–398 (published by John Wiley and Sons, Inc., N.Y., 1952). Variations of the conditions of reaction as generally outlined in the art depending on the type of monomer composition, initiator system, and type of polymerization procedure selected are within the purview of the skilled artisan.

For use in suspension polymerization, various suspending agents such as gelatin, hydroxymethyl cellulose, hydroxyethyl cellulose, hydroxypropyl cellulose, carboxymethyl cellulose, talc, clay, polyvinyl alcohol and the like can be used in the method of the present invention. Other suspending agents which are known to be useful in the suspension polymerization of vinyl halides can also be used. The type and amount of the suspending agent used has, as is known, some influence on the particle size of the finally obtained product. The exact amounts of suspending agent and type can be selected by the skilled artisan so as to provide the particle size of product desired. Various other additives, such as thermal stabilizers, and the like, which are normally utilized in the polymerization can also be included. Suspension polymerization techniques are generally preferred in that the polymerization is easier to conduct and the product obtained has a particle size which is more easily handled and used by polymer processors.

Various emulsifying agents which can be used in emulsion polymerization of vinyl halide are illustrated by sodium lauryl sulfate, potassium stearate, alkyl benzene sulfonate, and ammonium dialkyl sulfosuccinate and can be used in the practice of the present inventon. Other emulsifying agents which are also known to be useful in emulsion polymerization of vinyl halides can also be used. The exact amounts of the emulsifying agent and a type which is used are easily determined by the skilled artisan. In general, any of the additives such as catalysts and stabilizers, which are normally used in emulsion polymerization of vinyl halides can be utilized in the practice of the present invention. The product obtained from the emulsion polymerization which is in the form of a latex can be utilized per se or the latex can be coagulated to precipitate the polymer particles which can then be dried and processed into any desired form by polymer processor.

The solvents which are used in solution polymerization can be those in which only the monomer is soluble and those in which both the monomer and resulting polymer are soluble, the former solvents being preferred. Illustrative of the monomer soluble, polymer insoluble solvents which can be used in the performance of a solution polymerization of vinyl halides are: pentane, hexane, benzene, toluene and cyclohexane.

Illustrative of monomer-polymer solvents which can be used in the solution polymerization of vinyl halides are: cyclohexanone, tetrahydrofuran, dimethyl sulfoxide, and dimethyl formamide. A mixture of solvents can also be used to reduce cost, e.g., as by the use of an expensive solvent diluted with an inexpensive non-solvent or weak solvent. Illustrative of solvent mixtures are: tetrahydrofuran and toluene or petroleum ether. The foregoing solvents and mixtures are given as illustrative and are in no way intended to be inclusive of all the possible solvents and mixtures thereof which can be utilized.

The polymerization reaction is initiated at a first reaction temperature which is conducive to forming a polymer of a selected average molecular weight, the average molecular weight varying inversely with temperature. Thus, if the selected average molecular weight is to be high, a low temperature is used and, conversely, if the selected average molecular weight is to be low, a higher temperature is used. Upon partial completion of the polymerization reaction, the reaction temperature is changed and the polymerization is continued at a reaction temperature either higher or lower than the first reaction temperature such that a polymer having an average molecular weight different from that obtained at the first reaction temperature is produced. The polymerization can and preferably is, completed at the second reaction temperature, though a third or fourth reaction temperature can be used if desired. The temperature can also be changed incrementally or continuously over the period of the polymerization reaction to provide the same effect. The present invention is intended to include not only substantially direct changes in temperature but also the use of incremental and continuous temperature changes.

The selection of the first and subsequent reaction temperatures and the period of time the polymerization is conducted at any selected temperature, is dependent on the properties desired in the final polymer product. In general, the properties of the final product are governed by the average molecular weight distribution or the amount of polymer chains having specific molecular weights contained in the polymer particle. In the product of the present invention, the molecular weight distribution in the final product is based on the additive quantity of all the polymer produced during the polymerization reaction. An approximate plot of molecular weight distribution can be formulated prior to polymerization by determining the molecular weight distribution curve of polymer formed under one set of reaction conditions and adding to that the corresponding molecular weight amounts that can be formed during subsequent polymerization conducted under different reaction conditions. The molecular weight distribution is influenced by reaction conditions such as temperature, time, and half-life of the initiator. For any one set of conditions, a specific molecular weight distribution is generally obtained and can be plotted (amount vs. molecular weight). A change in the reaction conditions brings about a change in the molecular weight distribution and hence a new curve can be plotted for the conditions. The additive total can be used to approximate the composition of the final product. Thus, by determining the molecular weight distributions obtainable under certain sets of conditions, it is now possible to program the polymerization reaction to provide polymer particles having numerous and diverse molecular weight distributions so as to provide polymers having diverse physical properties. This can easily be done by one skilled in the art.

Under any one set of conditions conducive to polymerization, polymer is formed, the amount being dependent upon the rate of polymerization and the time the polymerization is conducted under those conditions. In order to provide polymer products of the invention, the polymerization is preferably allowed to proceed to a minimum extent at each temperature. Such minimum extent is dependent on the number of temperature changes used as the final product is an additive total of all polymer produced during the process cycle inasmuch as some polymer of each specific molecular weight is generally produced at each temperature used. Generally, as the number of temperature changes increases, the minimum extent decreases. A convenient means for setting forth such extent and calculating the same is by the following expression:

Minimum polymerization during any stage of reaction = $1/n$ % conversion of final product wherein $n$ is a number of at least 2 and equals the number of temperature changes. In a two stage process, the minimum extent of polymerization at any one temperature is 0.5%, in a 3-step process 0.33%, in a 4-step 0.25%, and so forth. As $n$ approaches infinity, the conversion rate at any one temperature approaches zero and this is the limiting factor in a process wherein the temperature is continuously changed during the entire reaction. The maximum polymer formation for any one polymerization procedure step, based on total weight of the final product would be 100 minus the minimums required for the remaining polymerization steps or $$100 - \left(\frac{n-1}{n}\right)$$

wherein $n$ is as defined before. Preferably, the polymerization is carried to at least a 1% and more preferably to at least a 10% conversion point when using from 2 to 10 temperature changes and maximums are preferably within the range of 90% to 99% and more preferably 30% to 70%. Using a two temperature system, it is preferred to allow the first polymerization step to at least 30% but not more than 60% completion and more preferably to at least 45 but not more than 55%, the percentages being by weight based on the total weight of the final product.

The polymerization of the vinyl halide monomers is a free-radical polymerization reaction and is conducted in the presence of a free-radical initiator. Useful free-radical initiators are organic or inorganic peroxides, persulfates, ozonides, hydroperoxides, peracids and percarbonates, azo compounds, diazonium salts, diazotates, peroxysulfonates, trialkyl borane-oxygen systems, and amine oxides. Azobisisobutyronitrile is particularly useful in the present invention. The initiator is used in concentrations ranging from about 0.01 to about 1.0% by weight based on the total weight of the monomers. For use in mass, suspension, and solution polymerization, the initiators which are soluble in the organic phase, such as benzoyl peroxide, diacetyl peroxide, azobisisobutyronitrile or diisopropyl peroxydicarbonate, azobis ($\alpha$-methyl $\gamma$-carboxybutyronitrile), caprylyl peroxide, lauroyl peroxide, azobisisobutyramidine hydrochloride, t-butyl peroxypivalate, 2,3-dichlorobenzoyl peroxide, azobis (α-γ-dimethylvaleronitrile) are generally used. For use in emulsion polymerization, water soluble initiators such as ammonium persulfate, hydrogen peroxide are used. Preferably, the initiator which is used is chosen from a group of initiators known in the prior art as the "hot catalysts" or those which have a high degree of free-radical initiating activity at lower temperatures as indicated by the short half-life of the compounds. Initiators with a lower degree of activity are less desirable in that they require longer polymerization times. Also, long polymerization times may cause preliminary product degradation evidenced by color problems, e.g., pinking. Other known free-radical initiators, such as light illumination or irradiation with gamma-ray can also be used. Initiators which tend to cause ionic or coordination polymerization such as the Ziegler-type initiators can be used in the present invention if organic solvents are used as the reaction medium. The selection of any initiator system is dependent on the temperature utilized in polymerization since the free-radical generating activity of initiators generally varies with temperature. Such selection can be made by anyone skilled in the art.

Free-radical polymerization is generally conducted in the presence of only one free-radical initiator. In one embodiment of the invention, two free-radical initiators can be used during polymerization, one of which has a different free-radical initiating activity or different half-life than the other. Preferably, one catalyst is used during the first portion of the polymerization at the first reaction temperature, and the second is used during the second portion at the second reaction temperature. More preferably, and where the first reaction temperature is higher than the second reaction temperature, the first catalyst has a longer half-life than the second. The use of the diverse catalysts in combination with the temperature changes provides a further method of modifying the molecular weight distribution curves of the products prepared under those specific conditions and of the molecular weight distribution curve of the final product. This further increases the range of products which can be prepared in accordance with the present invention. Of those catalysts presently known, those with half-lives of from 1200 minutes to about λ minutes at 80° C. can be used for the first part of the polymerization which is preferably conducted at temperatures of from about 60° C. to about 80° C. These catalysts are illustrated by: azobisisobutyronitrile, azobis (α-methyl γ-carboxybutyronitrile), acetyl peroxide, benzoyl peroxide, t-butyl peroxyisobutyrate and the like. Of those for the second part of the reaction, those with half-lives of from about 4 minutes to about 150 minutes at 80° C. can be used at the lower temperatures of polymerization which are preferably of from about 40° C. to about 60° C. These are illustrated by: isopropyl percarbonate, azobis (α-γ-dimethylvaleronitrile), 2,4-dichlorobenzoyl peroxide, t-butyl peroxypivalate, azobisisobutyramidine hydrochloride, lauryl peroxide, caprylyl peroxide, azobisisobutyronitrile, azobis (α-methyl-γ carboxybutyronitrile), acetyl peroxide and the like.

In another form of the present invention, the polymerization reaction is initiated at a first reaction temperature which is conducive to forming a polymer of a high molecular weight. Upon partial completion of the polymerization reaction, e.g., from at least 1.0%, and preferably at least 3.0%, but not more than 15%, the percentage being by weight based on the total weight of the final polymer product, the reaction temperature is changed and the polymerization is continued at a reaction temperature higher than the first reaction temperature. A polymer product is produced which has a molecular weight distribution similar to that obtained utilizing the higher temperature alone with the exception of the presence of additional high molecular weight polymer. The polymerization can and preferably is, completeted at the second reaction temperature, though a third or fourth reaction temperature can be used if desired. The temperature can also be changed incrementally or continuously over the period of the polymerization reaction to provide the same effect. The present invention is intended to include not only substantially direct changes in temperature but also the use of incremental and continuous temperature changes. In the alternative, and less preferred, embodiment of the invention the temperature sequence is reversed, i.e., high temperature first and low temperature at the completion of the polymerization.

In this embodiment of the invention, two free-radical initiators generally are used during polymerization, one of which has a different free-radical initiating activity or different half-life than the other. One initiator is used during the first portion of the polymerization at the first reaction temperature, and the second is used during the second portion at the second reaction temperature. Initiators having a half-life of 30 minutes or less at 80° C. are suitable for use during the first polymerization step at, preferably, a temperature within the range of from about 15° C. to about 50° C. Initiators with longer half-lives are used for the remainder of the polymerization. Those initiators with short half-lives are preferably, along with a low temperature of reaction, used for the first part of the polymerization which is usually conducted at temperatures of from about 15° C. to about 50° C. These initiators having half-lives less than 30 minutes at 80° C. can be azobis (α-γ-dimethyl-γ-methoxyvaleronitrile), azobis (α-γ-dimethylvaleronitrile), 2,4-dichlorobenzoyl peroxide, t-butyl peroxypivolate, azobisisobutyramidine hydrochloride. Of those initiators for the second part of the reaction, those with half-lives of greater than 30 minutes at 80° C. which can be used at the temperatures of polymerization of from about 50° C. to about 90° C., the following are illustrative: lauryl peroxide, caprylyl peroxide, azobisisobutyronitrile, azobis (α-methyl-γ-carboxybutyronitrile), acetyl peroxide, benzoyl peroxide, t-butyl peroxyisobutyrate and the like. The foregoing are given as illustrative and applicants are intended not to be bound thereby. Any combination of catalysts with diverse half-lives can be used and varied depending on reaction temperatures and products desired from the polymerization.

The polymerization is also preferably conducted in the presence of a polymer modifier. Included within the term polymer modifiers are chain transfer agents, grafting agents, etc. Preferably, the polymer modifiers are polymercaptan compounds having at least 2 and preferably 3 or more mercaptan groups per molecule. The remainder of the polymercaptan molecule can be aliphatic, aromatic or substituted derivatives thereof. Generally, these compounds can be depicted by the formula:

$$(-\overset{|}{\underset{|}{C}}-SH)_n$$

wherein the free bonds of the carbon atom can be attached to aliphatic, aromatic or inorganic moieties and n is an integer of at least 2 and preferably above 3. Compounds of the preferred type are more fully described in U.S. Pat. No. 3,696,083 which was based on U.S. Ser. No. 84,470, filed Oct. 27, 1970, which is a continuation of the now abandoned U.S. patent application Ser. No. 664,903 to Hwa, filed 9/1/67, the contents of which are incorporated herein by reference.

These modifiers are illustrated by: pentaerythritol tri-(3-mercaptopropionate), pentaerythritol tetra-(3-mercaptopropionate), and mixtures of these; trimethyloethane tri(3-mercaptopropionate), pentaerythritol tetrathioglycolate, trimethylolethane, trithioglycolate, trimethylolpropane tri(3-mercaptopropionate), trimethylolpropane trithioglycolate and the like.

The amount of polymercaptan compound used in the process of the present invention is based on the functional equivalency of the mercaptan groups per mole of monomer used in forming the final polymer. Polymers can be prepared in accordance with the present invention by utilizing quantities of a polymercaptan compound sufficient to provide an —SH equivalence of from about 0.00015 to about 0.05 equivalence —SH per mole of monomer used to form the final polymer. Equivalency is computed in accordance with the following formula:

$$\frac{\text{number —SH groups/compound}}{\text{molecular weight of compound}} \times \frac{\text{amount of compound used}}{\text{in grams/mole of monomer}} = \text{equivalence}$$

The above formula can be used to directly compute the —SH equivalence of a single polymercaptan compound. The equivalence of admixtures of different polymercaptans are obtained by determining the equivalence for each polymercaptan using the above formula followed by adding the equivalence from each to obtain the total —SH equivalence of —SH groups present during the polymerization. Preferably, the —SH equivalence is maintained within the range of about 0.00015 to about 0.005, and more preferably within the range of about 0.0003 to about 0.002 —SH equivalence per mole of monomer.

Other polymer modifiers which can be used are the polybutadiene polymers which are disclosed in U.S. patent application Ser. No. 681,074 to Gelman, filed 11/7/67, now U.S. Pat. 3,562,358, issued 2/9/71, the mercapto-functional polybutadiene polymers disclosed in U.S. patent application Ser. No. 664,903 to Hwa, filed 9/1/67 (see third paragraph above for details. See also U.S. Pat. No. 3,546,323 to Hwa et al. issued 12/8/70. Also, admixtures thereof can be utilized such as is disclosed in U.S. patent application Ser. No. 681,099, to Gelman, filed 11/7/67, now U.S. Pat. 3,562,359 issued 2/9/71. It is intended that all of the disclosures of the foregoing applications be incorporated herein by reference.

In any of the foregoing polymerization procedures, any other additives which are now commonly utilized can also be included within the polymerization mixture. Other procedures such as short-stopping the polymerization at a desired point can also be utilized in accordance with the present invention.

The polymerizaton products of the present invention can be admixed with various conventional inert additives such as fillers, dyes, and pigments. Also, the polymerization products can be admixed with impact modifiers, plasticizers, lubricants, additional thermal stabilizers, and ultra-violet light stabilizers as desired.

The invention is further illustrated in the examples which follow using as representative of the various polymerization systems, the preferred suspension polymerization system.

EXAMPLES

Suspension Polymerization Procedure

In the following examples, the following suspension polymerization procedure is utilized unless otherwise indicated.

The reaction mixture or charge is sealed in an autoclave equipped with an agitator and a temperature control apparatus. The reaction mixture is polymerized for a total of about 10 hours under agitation rotating at about 250 RPM. Conversion is generally above 95%. The constituents of the charge (given in parts by weight), the times and temperatures of polymerization and the relative viscosities of the final products as measured at 30° C. using a solution of 1 gram of polymer dissolved in 100 grams of cyclohexanone in a Ubbelohde viscosimeter, are tabularized in Table I hereinafter along with representative values of polyvinyl chloride homopolymers prepared using standard suspension polymerization techniques. In Examples 1 through 8, the suspending agent is hydroxymethyl cellulose, the initiator is azobisisobutyronitrile, the modifier is a commercially available blend of polymercaptans containing:

35% pentaerythritol tetra(3-mercaptopropionate)
35% pentaerythritol tri(3-mercaptopropionate)
10% pentaerythritol di(3-mercaptopripionate)
10% pentaerythritol mono(3-mercaptopripionate)
and the short stop is,
2,6-di-tert-butyl-4-methylphenol.

TABLE I

| Example | 1 | 2 | 3 | 4 | 5 | 6 | 7 | 8 |
| --- | --- | --- | --- | --- | --- | --- | --- | --- |
| Charge |  |  |  |  |  |  |  |  |
| Vinyl Chloride | 108.9 | 108.9 | 108.9 | 108.9 | 108.9 | 108.9 | 108.9 | 108.9 |
| Deionized Water | 276.7 | 276.7 | 276.7 | 276.7 | 276.7 | 276.7 | 276.7 | 276.7 |
| Suspending Agent | 0.11 | 0.11 | 0.11 | 0.11 | 0.11 | .095 | .095 | .08 |
| Initiator | 0.073 | 0.073 | 0.073 | 0.073 | 0.073 | 0.097 | 0.097 | 0.097 |
| Modifier | 0 | 0.1 | 0.1 | 0.11 | 0.145 | 0.145 | 0.145 | 0.145 |
| Short Stop | 0.11 |  |  | 0.11 | 0.11 | 0.11 | 0.11 | 0.11 |
| Reaction Temp. (Initial) (°C) | 72°C | 65°C | 65°C | 65°C | 65°C | 65°C | 65°C | 65°C |

TABLE I-continued

| Example | 1 | 2 | 3 | 4 | 5 | 6 | 7 | 8 |
|---|---|---|---|---|---|---|---|---|
| Reaction Time (Initial Temp.) | 2 | 3.5 | 2.5 | 3.5 | 3 | 3 | 3 | 3 |
| Reaction Temp. (Second) | 52°C | 59°C | 56°C | 55°C | 56°C | 52°C | 56°C | 52°C |
| Reaction Time (hours) (Second Temp.) | 6 | 4.75 | 9.0 | 6.5 | 7.25 | 7.75 | 7 | 7 |
| Relative Viscosity (Product) | 2.20 | 1.86 | 1.90 | 1.98 | 1.90 | 1.92 | 1.96 | 1.93 |

The polymerization procedure set forth above operates equally as well to provide the desired final product when other suspending agents, e.g., gelatin, polyvinyl alcohol, hydroxypropyl cellulose, carboxymethyl cellulose, hydroxyethyl cellulose, talc and clay, are used in place of the hydroxymethyl cellulose. Similarly, the azobisisobutyronitrile initiator can be replaced by lauroyl peroxide, diisopropylperoxy dicarbonate, or t-butyl peroxypivalate initiators.

The approximation of actual processing conditons and the determination of the processability of a polymer can be done in a laboratory by means of a fusion torque rheometer. The polymer in powdered form is placed in the instrument and is fused under the influence of heat and shear. The instrument, which is basically a dynamometer, measures the torque force required to maintain mixer rotors revolving at a constant speed while the polymer is being fused. The torque generally rises from a low point when the sample of polymer is in powdered form to a high point at flux after which the torque subsides to an intermediate equilibrium point or equilibrium torque. The torque remains constant until the polymer degrades whereupon the torque increases due to polymer crosslinking. The equilibrium torque value determines the amount of work in meter-grams which must be applied to the polymer to process the same. The tests are conducted using a 60 cm³ sample bowl using Banbury type rotors adjusted to operate at 60 revolutions per minute at a temperature of 180° C. The test samples comprise 100 parts by weight of polymer, 3 parts by weight of a stabilizer (Thermolite 31 which is a sulfur-containing organotin compound manufactured by Metal and Thermit Corporation, Rahway, N.J.) and 0.5 part by weight of a lubricant (calcium stearate). Values reported for fusion torque rheology are in meter-grams and are for equilibrium torque.

| Conventional Polyvinyl Chloride Homopolymer | Relative Viscosity | Equilibrium Melt Viscosity (Meter-grams) |
|---|---|---|
| 1 | 2.12 | 2200 |
| 2 | 1.98 | 1800 |

The relative viscosity data in the Table is an indication of molecular weight. Generally, as the relative viscosity increases so does the molecular weight. The product of Example 1, as can be seen from the Table, has a higher relative viscosity and therefore a higher molecular weight than the first listed conventional polyvinyl chloride homopolymer. And, generally, as the relative viscosity increases so does the amount of work required to process the polymer. However, and as can be seen from the data in the Table, the amounts of work necessary to process the product of Example 1 and the first conventional polyvinyl chloride homopolymer are substantially equal even though the product of Example 1 has a higher relative viscosity than the homopolymer.

The invention is further illustrated in the examples which follow, using a two temperature system and the preferred suspension polymerization system.

EXAMPLES 9 – 14

Suspension Polymerization Procedure

In Examples 9 to 14, the following suspension polymerization procedure is used unless otherwise indicated. The reaction mixture or charge is sealed in a one quart soda bottle, the bottle is immersed in a temperature controlled water bath, and the polymerization is conducted for a total of approximately 12½ hours; 4½ hours at 43° C. and 8 hours at 65° C. The bottles are rotated end over end at 41 revolutions per minute in the bath to provide agitation. Conversion is usually above 80%. The charge consists of the following mate-

TABLE II

| Example | 1 | 2 | 3 | 4 | 5 | 6 | 7 | 8 |
|---|---|---|---|---|---|---|---|---|
| Relative Viscosity (Product) | 2.20 | 1.86 | 1.90 | 1.98 | 1.90 | 1.92 | 1.96 | 1.93 |
| Equilibrium Melt Viscosity (Meter-grams) | 2130 | 1515 | 1635 | 1740 | 1680 | 1650 | 1770 | 1620 |
| Type of Degradation* | Cat | Non-Cat | Cat | Cat to Semi | Cat | Semi | Cat | Semi |
| Time | 19' | 34 | 30 | 32 | 33' | 35' | 33 | 34 |

*Based on rate of failure.
0–25 meter-grams per minute = non-catastrophic
25–100 meter-grams per minute = semi-catastrophic
100 and above meter-grams per minute = catastrophic rials in amounts given in approximate parts by weight:

| Charge | Parts by Weight (Dry) |
|---|---|
| Vinyl Chloride | 100 |
| Deionized Water | 300 |
| Suspending Agent (1) | 0.5 |
| Initiator A (2) | See Table III |
| Initiator B (3) | See Table III |

(1) Hydroxymethylcellulose
(2) t-Butyl Peroxypivalate
(3) Azobisisobutyronitrile

TABLE III

| Example | 9 | 10 | 11 | Control Samples | | |
| | | | | 12 | 13 | 14 |
|---|---|---|---|---|---|---|
| Initiator A | 0.065 | 0.130 | 0.130 | — | 0.065 | 0.130 |
| Initiator B | 0.065 | 0.033 | 0.065 | 0.065 | — | — |
| Total | 0.130 | 0.163 | 0.195 | 0.065 | 0.065 | 0.130 |
| Percent Yield | 88% | 81% | 98% | 84% | 100% | 99% |

The polymers of Examples 9 – 11 showed a decrease in the amount of torque required to process the polymers over the torques required for the comparable control samples.

The foregoing examples have illustrated the method of the present invention using vinyl chloride as the vinyl halide monomer. Other vinyl halide monomers such as vinyl bromide, vinyl iodide, vinylidene chloride, vinylidene bromide, vinylidene iodide and mixtures thereof can be substituted for the vinyl chloride with equal facility. Vinyl fluoride and vinylidene fluoride which have very low vapor pressures can also be used in high pressure polymerization vessels. As illustrative, 155 parts vinylidene chloride or 90 parts vinyl chloride/15.5 parts vinylidene chloride can be used in place of the 100 parts vinyl chloride with equal facility.

Various copolymers and terpolymers using non-vinyl halide type monomers in combination with the vinyl halide monomer can also be prepared with equal facility. As illustrative, 80 parts vinyl chloride/15.5 parts vinylidene chloride/27.5 parts deithyl fumarate, or 90 parts vinyl chloride/13.75 parts vinyl acetate, or 80 parts vinyl chloride/41.5 parts monomethyl maleate, or 90 parts vinyl chloride/16 parts ethyl acrylate, or 90 parts vinyl chloride/8.5 parts acrylonitrile, or 90 parts vinyl chloride/11.5 parts vinyl ethyl ether can be used in place of the 100 parts vinyl chloride in the preceding examples. Any other non-vinyl halide type monomers such as those listed hereinbefore can be susbstituted with equal facility to prepare copolymers and terpolymers.

The polymers prepared in accordance with the present invention can be used in applications such as the preparation of calendered film, blow molded bottles, extruded flat bed and blown film, extruded articles, tubing, in injection molding, fluidized bed coating, electrostatic powder spraying, rotational casting, additives to other polymers to increase toughness of the resulting blend or wherever polyvinyl chloride is presently used. It is understood that the polymers of the invention can be compounded with additives usually employed in the coating, impregnating and molding composition arts.

Thus, and in accordance with the present invention, there is provided a method for the preparation of a new class of vinyl halide polymers which exhibit improved processing characteristics, without sacrificing physical properties.

We claim:

1. A method for preparing vinyl halide polymers exhibiting improved processing characteristics without sacrificing physical properties comprising:
   a. iniating the free radical suspension polymerization of a ethylenically unsaturated monomer composition containing at least 75%, by weight, of a vinyl halide of the formula:

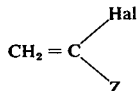

wherein Z is hydrogen or halogen and Hal is halogen at a first reaction temperature; said polymerization being conducted in the presence of a first azo compound as a free radical initiator and of a polymer modifier comprising a polymercaptan chain transfer agent; and, after partial polymerization is accomplished;
   b. changing the reaction temperature to at least one subsequent reaction temperature different from the immediately preceding reaction temperature, adding a second azo compound as a free radical initiator, and continuing said polymerization at said subsequent temperature, said subsequent temperature being conducive to forming a polymer of an average molecular weight different from the average molecular weight obtained during polymerization at said immediately preceding reaction temperature;
one of said azo compounds having a shorter half-life than the other at 80°C.

2. A method as recited in claim 1 wherein said first reaction temperature is higher than said second reaction temperature and said second initiator has a half-life which is shorter than said first at 80° C.

3. A method as recited in claim 1 wherein said monomer composition consists of 100% vinyl chloride.

4. A method as recited in claim 1 wherein said polymerization is initiated at a first reaction temperature which is lower than said second reaction temperature and which is within the range of from about 15° C. to about 50° C. and in the presence of an azo compound having a half-life of less than 30 minutes at 80° C.

5. A method as recited in claim 1 wherein said polymerization at said first reaction temperature is allowed to proceed to from at least 1.0%, by weight, but not more than about 15%, by weight, of the final weight of the polymer composition.

* * * * *

UNITED STATES PATENT AND TRADEMARK OFFICE
CERTIFICATE OF CORRECTION

PATENT NO. : 3,945,985
DATED : March 23, 1976
INVENTOR(S) : Leonard Feiler and Sheldon F. Gelman It is certified that error appears in the above-identified patent and that said Letters Patent are hereby corrected as shown below:

Under Related U.S. Application Data, please delete filing date of "August 8, 1968" and insert -- August 29, 1968 --;

Column 1, line 9, please delete filing date of "August 8, 1968" and insert -- August 29, 1968 --;

Column 1, line 39, please delete "vaious" and insert -- various --;

Column 3, lines 30-31, please delete "cyanoacrlates" and insert -- cyanoacrylates --;

Column 4, line 47, please delete "inventon" and insert -- invention --;

Column 7, line 48, please delete symbol "$\lambda$" before the word "minutes" and insert -- 80 --;

In the Claims, Claim 1, under a., please delete "iniating" and insert -- initiating --;

Signed and Sealed this

Twenty-second Day of March 1977

[SEAL]

Attest:

RUTH C. MASON
Attesting Officer

C. MARSHALL DANN
Commissioner of Patents and Trademarks